United States Patent
Court

[19]

[11] Patent Number: 5,890,706
[45] Date of Patent: *Apr. 6, 1999

[54] HYDRAULIC MOUNTING

[75] Inventor: Peter Thomas Court, Melksham, England

[73] Assignee: BTR Plc, London, England

[*] Notice: This patent issued on a continued prosecution application filed under 37 CFR 1.53(d), and is subject to the twenty year patent term provisions of 35 U.S.C. 154(a)(2).

[21] Appl. No.: 652,319

[22] Filed: May 23, 1996

[30] Foreign Application Priority Data

May 23, 1995 [GB] United Kingdom .................... 9510334

[51] Int. Cl.$^6$ .................................................. B60G 13/00
[52] U.S. Cl. .................... 267/220; 267/293; 267/140.12; 267/140.13
[58] Field of Search .............................. 267/220, 140.13, 267/141.3, 219, 140.12, 293; 248/562, 636

[56] References Cited

U.S. PATENT DOCUMENTS

| 4,199,128 | 4/1980 | Van Den Boom et al. ... 267/140.13 X |
| 4,741,521 | 5/1988 | Bellamy et al. .................... 267/140.13 |
| 4,832,319 | 5/1989 | Noguchi et al. .................... 267/140.13 |
| 4,871,150 | 10/1989 | Le Salver et al. ................. 267/140.13 |
| 4,887,801 | 12/1989 | Wolf et al. ........................... 267/140.13 |
| 5,040,775 | 8/1991 | Miyakawa ............................... 267/220 |
| 5,277,410 | 1/1994 | Oshima et al. ......................... 267/220 |
| 5,474,284 | 12/1995 | Hamaekers et al. .................... 267/220 |

FOREIGN PATENT DOCUMENTS

| 0 065 298 | 11/1982 | European Pat. Off. . |
| 0 278 054 | 8/1988 | European Pat. Off. . |
| 2 169 986 | 7/1986 | United Kingdom . |
| 2 195 166 | 3/1988 | United Kingdom . |
| 2 228 551 | 8/1990 | United Kingdom . |

Primary Examiner—Lee W. Young
Attorney, Agent, or Firm—Young & Thompson

[57] ABSTRACT

An hydraulic mounting comprises inner and outer rigid members radially spaced apart by an elastomeric member that forms a structural interconnection between the rigid members, a second elastomeric member axially spaced from the first elastomeric member and extending between the rigid members to define a fluid chamber, a rigid separator located within the chamber to divide it into high and low pressure zones, a fluid flow channel for passage of hydraulic fluid between the high and low pressure zones, a flexible member which interconnects between the separator and one of the inner and outer rigid members, and the separator being secured rigidly to the other of the inner and outer rigid members.

25 Claims, 1 Drawing Sheet

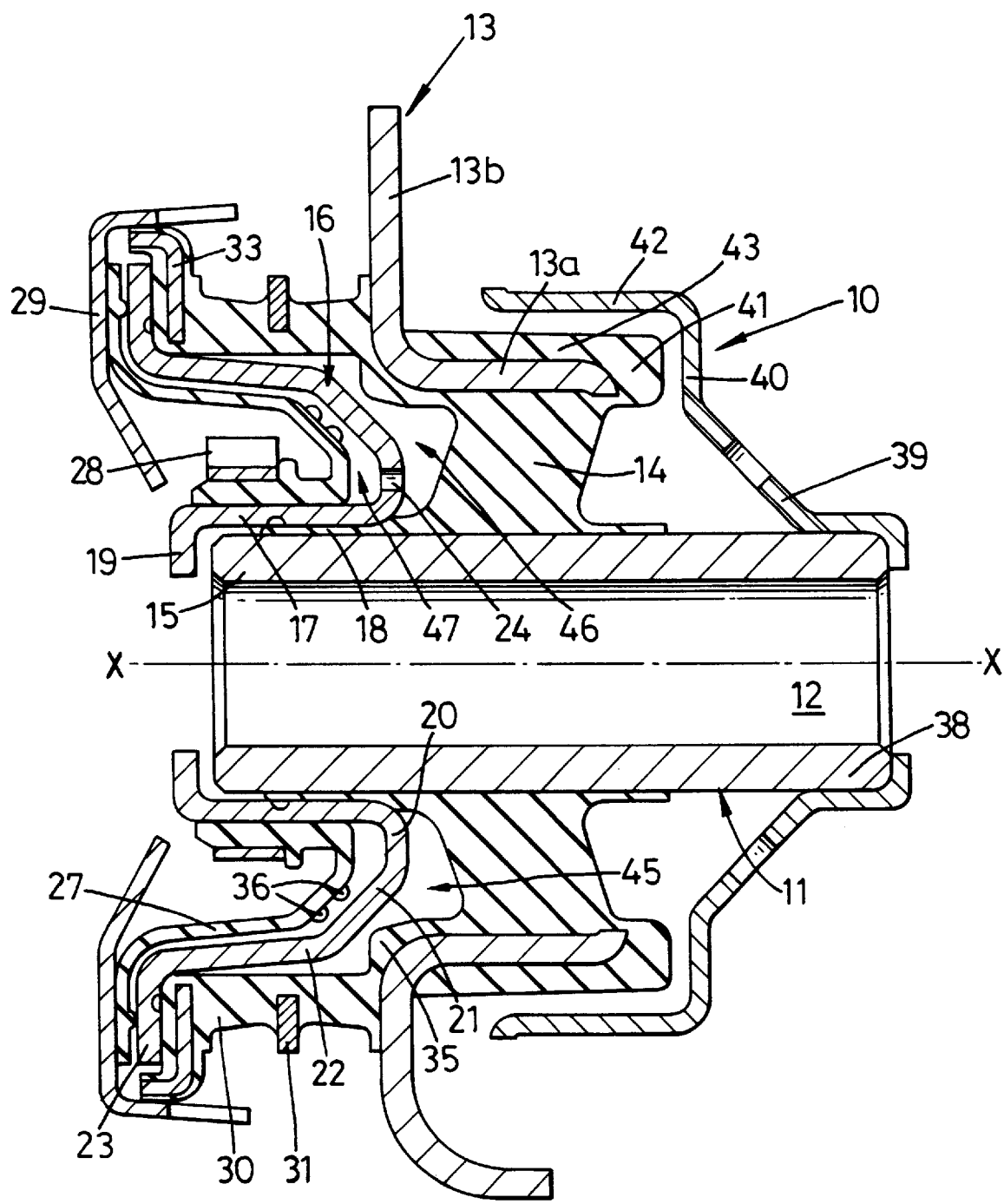

HYDRAULIC MOUNTING

BACKGROUND OF THE INVENTION

This invention relates to a so-called hydraulic mounting of the kind comprising a pair of rigid members structurally interconnected by an element of resilient elastomeric material and damped by the forced flow of hydraulic fluid in a damping chamber during relative movement of the rigid members.

DESCRIPTION OF THE RELATED ART

An hydraulic mounting Is required often to provide damping in two opposite axial directions of relative movement of inner and outer rigid members, and for that purpose it is conventional to provide a symmetrical arrangement in which two hydraulic damping units act in a back-to-back configuration. The provision of such a configuration results often in an undesirably great space envelope or a part of complex or expensive construction, and often the mounting will have the ability to accommodate only a small degree of relative conical movement between the inner and outer rigid members.

SUMMARY OF THE INVENTION

The present invention has as one of its objects the provision of an hydraulic mounting which is of a relatively simple construction. It seeks also to provide an hydraulic mounting which is able to accommodate relative axial, radial, torsional and conical movement of two rigid members.

The present invention provides an hydraulic mounting comprising an inner rigid member, an outer rigid member which lies radially outwards of the inner rigid member, a first elastomeric member which extends between the inner and outer rigid members at least in part to form a structural interconnection therebetween, a second elastomeric member which is spaced from the first elastomeric member, a fluid chamber defined at least in part by a space between the first and second elastomeric members, a rigid separator within said chamber to divide said chamber into high pressure and low pressure zones, fluid flow means for passage of hydraulic fluid between said high and low pressure zones, said rigid separator being secured substantially rigidly relative to one of the inner and outer rigid members and being interconnected to one of the rigid members by a flexible member.

The second elastomeric member may be relatively deformable compared to the first elastomeric member.

The flexible member by which the separator is interconnected with a rigid member may be an annular elastomeric element arranged to be loaded in compression during relative axial movement of the inner and outer rigid members in one direction of relative movement. The flexible member may incorporate reinforcing means whereby in the event of the flexible member being exposed to high fluid pressure in the fluid chamber deformation of the flexible member, for example to extend radially outwards, is inhibited by the reinforcement. The reinforcement may be in the form of an interleaf, such as a rigid metal or plastics ring, or it may be in the form of a filamentary reinforcement embedded in and for example extending axially along the length of the flexible member; a filamentary reinforcement may be constructed in a manner such as is known in relation to the manufacture of reinforced hose.

The flexible member may be formed integrally, or be integrally associated with at least the first elastomeric member. The first elastomeric member and flexible member may be positioned relative to one of the rigid members such that said one of the rigid members is not directly exposed to fluid in the fluid chamber.

Preferably the flexible member is arranged to extend between the rigid separator and the outer rigid member, with the rigid separator being secured substantially rigidly relative to the inner rigid member.

The first elastomeric member and/or the flexible member may be secured to a rigid member by bonding or by the use of adhesives.

The second elastomeric member may be secured relative to one of the rigid members and/or relative to part of the rigid separator for example by a clamping arrangement. The clamping arrangement may be provided for example by a clamping band such as of the type which can be tightened in situ, or by a permanently deformable metal member.

The first elastomeric element may be of annular form and may have a thickness in an axial direction (the major, longitudinal axial direction) which is at least 25%, preferably at least 50% of the thickness as considered in a radial direction. The axial thickness may be equal to or greater than said radial thickness. The first elastomeric element may provide the main structural interconnection between the inner and outer rigid members.

The inner rigid member may be of a solid construction, or for example tubular to accommodate a retention bolt whereby the inner rigid member may be secured for example to a structural part of a vehicle or a resiliently mounted part of the vehicle such as an engine or a suspension component.

The second elastomeric member may be of a relatively thin construction. Alternatively it may at least in part form a structural interconnection between the inner and outer rigid members. It may have a thickness less than a quarter and more preferably less than one tenth of its dimension as considered in a radial direction. It may contain an embedded reinforcement. It may be arranged to lie in part substantially adjacent the rigid separator at least when the mounting is in a static condition. It may be provided with a textured surface such that it is inherently adapted to separate relatively freely from contact with the rigid separator over at least a part of the respective confronting surfaces when hydraulic fluid is forced into the low pressure zone of the fluid chamber.

Preferably the high pressure zone of the fluid chamber is shaped and arranged such that during relative movement of the inner and outer rigid members in a first axial direction the volume of the high pressure zone inherently tends to decrease. In consequence the fluid in the high pressure zone increases in pressure and is forced through the fluid flow means to enter the low pressure zone. The fluid flow means may be provided by one or more orifices or channels in or associated with the rigid separator, the size of the or each orifice or channel and the number of orifices or channels being selected having regard to the desired fluid damping characteristics of the mounting.

Said reduction in volume of the high pressure zone of the fluid chamber during relative axial movement of the inner and outer rigid members in a first direction may be achieved by providing that the first elastomeric member is of a smaller radial extent than the radial extent of the rigid separator. It is further proposed that the spacing between the inner and outer rigid members shall be less than the spacing between the flexible member and that rigid member which is spaced radially from the flexible member.

The rigid separator may be formed from plastics material, which may be molded to a required shape, or from metal which may be shaped by pressing. The separator preferably is of an annular form to sit around, and optionally abut against an end of an inner rigid member. It may have an inner portion of substantially cylindrical form for securing relative to an inner rigid member, and be sealed thereto; one end of that cylindrical portion may have an inwardly extending flange for abutting the end of an inner rigid member. The other, non-flanged end of the cylindrical portion may have associated therewith a substantially frusto-conical shaped portion which extends radially outwardly and axially in a direction towards the flanged end. The radially outer edge of the rigid separator preferably lies axially beyond the flanged end of the inner cylindrical portion.

The radially outer edge of the rigid separator may have the second elastomeric member and the flexible member fluid tightly secured thereto by an external clamping member which extends around the outer edge of the separator.

A radially outer surface of an inner cylindrical portion of the rigid separator may provide a seating surface for a radially inner portion of the second elastomeric member; said inner portion of the elastomeric member may be fluid tightly secured to the cylindrical portion of the rigid separator by a circumferentially extending clamp.

One of the rigid members may be provided with a rigid abutment member and the other of the rigid members may be provided with a resilient buffer member whereby excessive relative axial movement of the inner and outer rigid members in one axial direction is resiliently restrained by contact between said abutment and buffer members.

Preferably said abutment and buffer members are provided in the region of an axial end of the first elastomeric member opposite that end at which the fluid chamber is provided.

An hydraulic mounting according to the present invention is suitable for use in a vehicle suspension system, such as an automobile suspension system, and may be used as a tie bar bush. When used as a tie bar bush the mounting may be orientated such that shock loads experienced by the suspension system in a fore and aft direction of vehicle movement load the mounting axially in a direction which causes an increase of pressure of fluid in the high pressure zone of the fluid chamber.

BRIEF DESCRIPTION OF THE DRAWING

An embodiment of the present invention will now be described, by way of example only, with reference to the accompanying diagrammatic drawing which is a longitudinal cross-sectional view of an hydraulic tie bar bush.

DESCRIPTION OF THE PREFERRED EMBODIMENT

The components of the tie bar bush shown in longitudinal cross-section in the accompanying drawing are of a circular, annular shape as viewed in a plane perpendicular to the longitudinal axis X—X.

The tie bar bush 10 comprises an inner rigid member 11 in the form of a steel tube having a through bore 12 for location of a retention bolt (not shown) by means of which the member 11 may be secured to one of two locations between which the bush is to form a structural interconnection.

The inner member 11 is surrounded along part of its length by an outer rigid member 13 which lies spaced from the inner rigid member. The outer rigid member comprises a cylindrical portion 13a from one end of which a flange portion 13b extends radially outwardly.

The inner and outer rigid members 11, 13 are interconnected by an annular first elastomeric element 14 which is bonded to the confronting cylindrical surfaces of the inner and outer rigid members in a manner conventional for a simple rubber bonded to metal elastomeric mounting.

One end 15 of the inner rigid member has secured thereto a selectively profiled pressed metal plate 16 which acts as a separator plate in a fluid chamber to be described below. The separator plate 16 comprises an inner cylindrical portion 17 which is swaged about the end 15 of the inner tube to compress therebetween a thin axial extension 18 of the inner region of the elastomeric material of the first element 14 bonded to the inner rigid member.

The cylindrical portion 17 has at one end a radially inwardly extending flange portion 19 the inner diameter of which is slightly greater than the bore 12 of the inner rigid member so that it acts as an axial stop.

The separator plate 16 has an opposite end-portion 20 which extends substantially radially outwardly to a first frusto-conical shaped portion 21 which in turn leads to a second frusto-conical shaped portion 22 and finally a radially outer and radially outwardly extending flange portion 23.

The frusto-conical shaped portions 21 and 22 extend away from the portion 20 in an axial direction towards the inner flanged end 19, and the outer flange 23 lies axially beyond the inner end flange 19.

The end portion 20 is provided with an aperture 24 for flow of hydraulic fluid between opposite sides of the plate 16.

A second elastomeric element is secured relative to the inner rigid member and is in the form of a thin flexible diaphragm 27. Diaphragm 27 is secured relative to the inner rigid member by means of a clamp 28 which holds it firmly about the outer cylindrical surface of the portion 17 of the separator plate 16, to form a fluid tight seal therebetween.

A radially outer region of the diaphragm 27 is sealingly secured to the outer flange portion 23 of the separator plate by means of an annual metal clamp 29.

The surface of the diaphragm 27 that confronts the separator plate 16 has a part textured surface formed by pips 36 that ensure a free flow of fluid to between said confronting surfaces.

An axially compressible flexible member in the form of a reinforced annular ring 30 extends axially between the outer rigid member 13 and the outer flange portion 23 of the separator plate 16 so as to accommodate change in spacing of the flange 23 and outer rigid member during relative axial movement of the inner and outer rigid members.

The annular ring 30 is formed of elastomeric material having intermediate its ends an embedded metal reinforcing interleaf 31 which extends part-way towards the radially inner surface of the ring. The annular ring 30 additionally is formed at an end adjacent the separator plate with a metal reinforcing element 33 typically of L-shape in cross-section. The reinforcing ring 33 assists in co-operating with the outer metal clamp 29 to provide a fluid tight seal between the annular ring 30 and the flange 23.

The other axial end of the annular ring 30 is secured by bonding to the flange portion 13b of the outer rigid member. The elastomeric material of the annular ring 30 is molded integrally with the first elastomeric element 14, a web 35 of elastomeric material extending between the body of the annular ring 30 and the body of the first elastomeric member 14.

The other end 38 of the inner rigid member carries an outwardly and axially extending annular abutment member 39 having a radially outwardly extending abutment portion 40.

The abutment portion 40 is aligned radially with an elastomeric buffer 41 which lies at that axial end of the inner cylindrical portion 13a of the outer rigid member opposite the flanged portion 13b.

The abutment member 39 additionally comprises an outer cylindrical portion 42 which surrounds an elastomeric cushion layer 43 that lies around the outer surface of the portion 13a of the rigid outer member. In an unloaded condition of the bush the elastomeric buffer 41 lies spaced axially from the abutment portion 40 of the abutment member 39, and the cylindrical portion 42 lies spaced radially outwards relative to the cushion 43.

In the aforedescribed construction the first elastomeric member 14, the diaphragm 27 and the annular elastomeric ring 30, together with the web 35 extending over the outer rigid member, co-operate to define a fluid chamber 45 which is filled with hydraulic fluid.

In use of the tie bar bush, relative axial movement causing the inner rigid member 11 to move axially in a direction to the right relative to the outer member 13, as viewed in the drawing, results in a reduction in volume of a high pressure zone 46 of the fluid chamber lying to the right of the separator plate 16. This arises in part because of the difference between the radial extent of elastomeric member 14 and the effective radial extent between the inner diameter of the diaphragm 27 and the inner diameter of the annular ring 30. Increasing pressure causes flow through the orifice 24 from the high pressure zone 46 to the low pressure zone 47 which in effect acts as a substantially unpressurised fluid reservoir.

Rebound movement is damped by the vacuum effect created in the high pressure zone 46 and consequential return flow of fluid from the low pressure to the high pressure zone.

The bush construction Is compact and in contrast to conventional back-to-back type configurations, the fluid damping effect for movement in either of the opposite axial directions X—X is provided by the components that lie solely to the left of the first elastomeric element 14 as viewed in the accompanying drawing.

The radial flexibility of the diaphragm 27 and the annular ring 30 ensure that conical flexibility is not significantly impeded.

The absence of fluid damping components to the right-hand side of the first elastomeric element 14 allows that region to be utilised for overload buffering in both axial and radial directions by virtue of the abutment member 39 and the elastomeric regions 41 and 43.

In contrast to a conventional back-to-back design the need to provide a fluid passage that extends through an axially central position is avoided. A generous space therefore is available for the first elastomeric element 14.

What I claim is:

1. An hydraulic mounting comprising an inner rigid member, an outer rigid member which lies radially outwards of the inner rigid member, a first elastomeric member which extends between the inner and outer rigid members at least in part to form a structural interconnection therebetween, a second elastomeric member which is spaced from the first elastomeric member, the second elastomeric member having a radially inner region and a radially outer region wherein said radially outer region lies radially outwards of said radially inner region, a fluid chamber defined at least in part by a space between the first and second elastomeric members, a rigid separator within said chamber to divide said chamber into high pressure and low pressure zones, said rigid separator having radially inner and radially outer regions and said radially inner and outer regions of the second elastomeric member being substantially rigidly secured respectively to said radially inner and outer regions of the rigid separator, and fluid flow means for passage of hydraulic fluid between said high and low pressure zones, said rigid separator being secured substantially rigidly relative to one of the inner and outer rigid members and being interconnected to the other of said rigid members by a flexible member, and said flexible member and one of said radially inner and outer regions of the second elastomeric member each being fluid tightly secured relative to one of the radially inner and outer regions of the rigid separator, wherein said rigid separator is secured substantially rigidly relative to said inner rigid member and also is interconnected to said outer rigid member by a flexible member.

2. A mounting according to claim 1 wherein the high pressure zone of the fluid chamber inherently tends to reduce in volume during relative movement of the inner and outer rigid members in a first axial direction.

3. A mounting according to claim 2 wherein the first elastomeric member is of a smaller radial extent between the inner rigid member and the outer rigid member than the radial extent of the rigid separator whereby the volume of the high pressure zone of the fluid chamber reduces during relative axial movement of the inner and outer rigid members in said first direction.

4. A mounting according to claim 2 wherein the spacing between the inner and outer rigid members is less than the spacing between the flexible member and said one of the inner and outer rigid members to which the rigid separator is secured.

5. A mounting according to claim 1 wherein the fluid flow means comprises an orifice or channel associated with the rigid separator.

6. A mounting according to claim 1 wherein the second elastomeric member is relatively deformable compared to the first elastomeric member.

7. A mounting according to claim 1 wherein the flexible member by which the separator is interconnected with said other of said rigid members is an annular elastomeric element arranged to be loaded in compression during relative axial movement of the inner and outer rigid members in one direction of relative movement.

8. A mounting according to claim 7 wherein said flexible member comprises reinforcing means arranged to restrain deformation of the flexible member in the event of the flexible member being exposed to high fluid pressure in the fluid chamber.

9. A mounting according to claim 1 wherein the flexible member is formed integrally or is integrally associated with at least the first elastomeric member.

10. A mounting according to claim 1 wherein the flexible member extends between the rigid separator and the outer rigid member and the rigid separator is secured substantially rigidly relative to the inner rigid member.

11. A mounting according to claim 1 wherein the first elastomeric element is annular and has a thickness in an axial direction which is at least 25% of the thickness of said first elastomeric element as considered in a radial direction between the inner rigid member and the outer rigid member.

12. A mounting according to claim 11 wherein the axial thickness is equal to or greater than said radial thickness of said first elastomeric element.

13. A mounting according to claim 1 wherein the first elastomeric element provides the main resistance to relative radial movement between the inner and outer rigid members at least when the mounting is in a static condition.

14. A mounting according to claim 1 wherein the second elastomeric member has a thickness less than a quarter of its dimension as considered in a radial direction.

15. A mounting according to claim 14 wherein the second elastomeric member is a reinforced diaphragm structure.

16. A mounting according to claim 1 wherein the second elastomeric member is provided with a textured surface whereby it is inherently adapted to separate relatively freely from contact with the rigid separator.

17. A mounting according to claim 1 wherein the rigid separator is an annular form.

18. A mounting according to claim 17 wherein the separator extends at least in part in a first axial direction from its radially inner edge and at least in part in a second axial direction opposite said first axial direction to said outer edge.

19. A mounting according to claim 18 wherein the separator is of substantially C-shape form as considered in cross-section in a plane containing a longitudinal axis about which the separator extends.

20. A mounting according to claim 1 wherein the radially outer region of the rigid separator has the second elastomeric member and the flexible member fluid tightly secured thereto.

21. A mounting according to claim 1 wherein one of said rigid members is provided with a rigid abutment member and the other of the rigid members is provided with a resilient buffer member whereby excessive relative axial movement of the inner and outer rigid members in one axial direction is resiliently restrained by contact between said abutment and buffer member.

22. An automobile suspension comprising a mounting according to claim 1 and installed in the automobile suspension such that a shock load experienced by the suspension causes the mounting to be loaded axially in a direction which causes an increase of pressure of fluid in the high pressure zone of the fluid chamber.

23. A mounting according to claim 11 wherein the axial thickness is at least 50% of said radial thickness of said first elastomeric element.

24. A mounting according to claim 14 wherein the second elastomeric member has a thickness less than one tenth of its dimension as considered in a radial direction.

25. A mounting according to claim 1 wherein the first elastomeric member is bonded to at least one of the inner and outer rigid members.

* * * * *